US006369751B1

(12) United States Patent
Naruse

(10) Patent No.: US 6,369,751 B1
(45) Date of Patent: Apr. 9, 2002

(54) SIGNAL RECEIVING APPARATUS OF GLOBAL POSITIONING SYSTEM AND MOBILE WIRELESS TERMINAL APPARATUS

(75) Inventor: Tetsuya Naruse, Chiba (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/691,961

(22) Filed: Oct. 19, 2000

(30) Foreign Application Priority Data

Oct. 20, 1999 (JP) .......................................... 11-298762

(51) Int. Cl.$^7$ ............................. G01S 5/02; H04B 7/185
(52) U.S. Cl. ..................................... 342/357.1; 701/215
(58) Field of Search ......................... 342/357.09, 357.1; 701/215

(56) References Cited

U.S. PATENT DOCUMENTS 5,781,541 A * 7/1998 Schneider ................... 370/335

6,307,840 B1 * 10/2001 Wheatley, III et al. ..... 370/252

* cited by examiner

Primary Examiner—Theodore M. Blum
(74) Attorney, Agent, or Firm—Jay H. Maioli

(57) ABSTRACT

A signal receiving apparatus of the global positioning system and a mobile wireless terminal apparatus execute the synchronization acquisition to the satellite signal at high speed and reduce the consumption of electric power. According to the present invention, since the spread spectrum signal from the base station of the cellular system, that is synchronized with the satellite signal to be transmitted from the GPS satellite, is received and based on the spread spectrum signal the system time signal as a reference signal used to synchronize with the satellite signal is generated, and receiving the satellite signal, the synchronization acquisition with the PN code in the satellite signal can be executed in a short period of time in synchronism with the system time signal. And thereby the consumption of electric power can be further reduced.

20 Claims, 7 Drawing Sheets

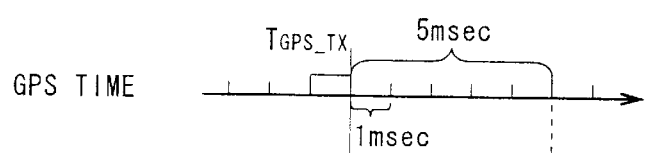
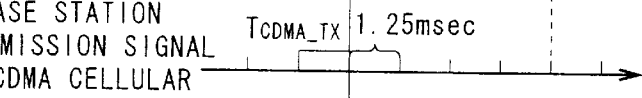
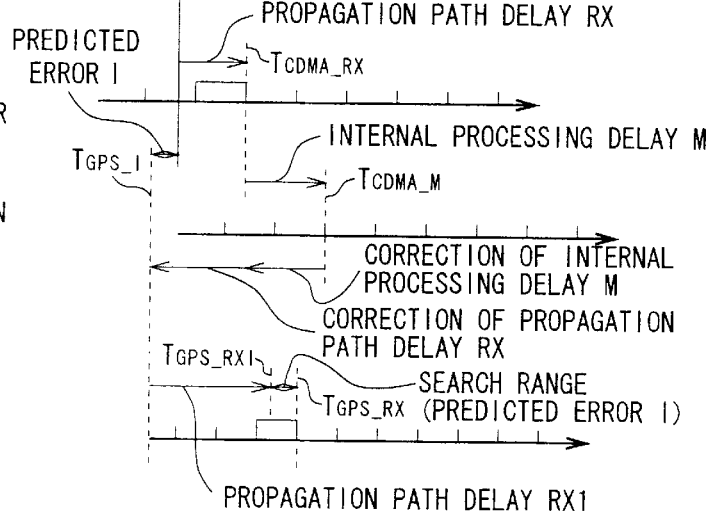

SIGNAL RECEIVING APPARATUS OF GLOBAL POSITIONING SYSTEM AND MOBILE WIRELESS TERMINAL APPARATUS

BACKGROUND OF THE INVENTION

1. Field of the Invention

The present invention relates to a signal receiving apparatus of the global positioning system and a mobile wireless terminal apparatus, and more particularly, is suitably applied to such as a signal receiving apparatus of the Global Positioning System (GPS) for conducting the location measurement of the mobile unit.

2. Description of the Related Art

Heretofore, in the global positioning system, satellite signals to be transmitted from the plural number of GPS satellites travelling around the earth are received by the GPS receiving apparatus, and by analyzing the received satellite signals, the distance between the GPS signal receiving apparatus and each GPS satellite is obtained. And based on this, the current location of the mobile unit is to be calculated.

The satellite signal to be transmitted from this GPS satellite is the signal spectrum diffused by the pseudo random noise (PN) code formed of code series of different type per each GPS satellite.

Accordingly, the GPS signal receiving apparatus can generate local PN codes corresponding respectively to multiple kinds of GPS satellites, and secures the synchronization by matching the phase of the local PN code generated to the phase of PN code of the satellite signal. And after supplementing the synchronization by tracking the satellite signal, the GPS signal receiving apparatus demodulates the navigation message (such as an orbit information for location measurement) from the GPS satellite by applying the inverse spread spectrum processing and calculates the current location based on the navigation message.

In practice, as shown in FIG. 1, the GPS signal receiving apparatus 1 enters a satellite signal S1 received via a GPS antenna 3 and signal receiving circuit 4 into the correlation circuit 5 of the GPS signal receiving unit 2. The correlation circuit 5, multiplying the local PN code C1 to be supplied from the PN code generation circuit 6 by satellite signal S1, calculates a correlation value S2 and sends this out to the control circuit 7.

When the correlation value S2 is in low level not exceeding the predetermined threshold value, the control circuit 7 judges that the PN code of the satellite signal S1 and the local PN code C1 generated at the PN code generation circuit 6 are not synchronized. And by supplying a phase control signal CTL1 to the PN code generation circuit 6, the control circuit 7 offset controls the phase of the local PN code C1.

The PN code generation circuit 6 offsets the phase of the local PN code C1 based on the phase control signal CTL1, and as well as transmitting the resultant phase-offset local PN code C1 to the correlation circuit 5, this PN code generation circuit 6 sends back the phase result information S3 showing the phase condition of the local PN code C1 to the control circuit 7.

Accordingly, in the case where the control circuit 7 judges that the synchronization has not been secured based on the correlation value S2 from the correlation circuit 5, controlling the PN code generation circuit 6 based on the phase control signal CTL1, it successively offsets the phases of the local PN code C1 by the PN code generation circuit 6 and sends these out.

Furthermore, when the correlation value S2 is at high level more than the predetermined threshold value, the control circuit 7 judges that the PN code of the satellite signal S1 and the local PN code C1 generated at the PN code generation circuit 6 are in synchronism and conducts synchronism supplements.

At this point, the control circuit 7 generates a demodulation control signal S4 for specifying the head timing of the cycle of the PN code obtained by acquiring the synchronization as the demodulation start time of the data synchronized with the PN code and outputs this to the correlation circuit 5.

With this arrangement, the correlation circuit 5 can demodulate the navigation message by applying the spectrum inverse diffusion processing to the satellite signal S1 based on the demodulation control signal S4 inside of the demodulation unit (not shown in Fig.).

In the GPS signal receiving apparatus 1 thus constructed, the PN code of the satellite signal S1 is not synchronized with the local PN code C1 generated at the PN code generation circuit 6 when the correlation value S2 is at the low level lower than the predetermined threshold value. Therefore, it is necessary to sequentially offset phases of the local PN code C1 and repeat the calculation processing of the correlation value S2 by the time the synchronization is obtained by means of the phase control signal CTL1.

In this case, as shown in FIG. 2 in the GPS signal receiving apparatus 1, since the satellite signal S1 is spread spectrum processed by the PN code of 1023 chips, the phase offset for 1023 chips should be conducted at the maximum by the time the synchronism is obtained if the phase relation between the PN code of the satellite signal S1 and the local PN code C1 generated at the PN code generation circuit 6 is not clear.

At this point, in the GPS signal receiving apparatus 1, since it requires a great deal of time to obtain the synchronization, the consumption of electric power is increased, and as a result, it has created a problem that the battery life has become short.

Furthermore, in the GPS signal receiving apparatus 1, in the case of demodulating the navigation message synchronized with the PN code of the satellite signal S1, since the head timing of the cycle of the PN code is not known till the synchronization is secured, it has created a problem that the navigation message could not be obtained unless all satellite signals S1 would be demodulated.

SUMMARY OF THE INVENTION

In view of the foregoing, an object of the invention is to provide a signal receiving apparatus of the global positioning system and mobile wireless terminal apparatus capable of securing the synchronization with respect to satellite signals at high speed and reducing the consumption of electric power.

The foregoing object and other objects of the invention have been achieved by the provision of a signal receiving apparatus of the global positioning system and mobile wireless terminal apparatus, in which the transmission signal from the base station of the communications system synchronized with the satellite signal to be transmitted from the satellite of the global positioning system is received, the timing signal as a reference signal used to synchronize with the satellite signal is generated based on the transmission signal of the communication system, the satellite signal is received and the synchronization with the pseudo noise code in the satellite signal is secured based on the timing signal to be supplied from the timing signal generating means, the acquisition of synchronization with the pseudo noise code in the satellite signal can be executed in a short time coinciding with the timing signal. And thus, the consumption of electric power can be further reduced.

The nature, principle and utility of the invention will become more apparent from the following detailed description when read in conjunction with the accompanying drawings in which like parts are designated by like reference numerals or characters.

BRIEF DESCRIPTION OF THE DRAWINGS

In the accompanying drawings:

FIGS. 4A to 4E are timing charts showing the relationship of signal reception timing between the GPS time and the transmission signal of the satellite station of the CDMA cellular system;

DETAILED DESCRIPTION OF THE EMBODIMENT

Figure 1:
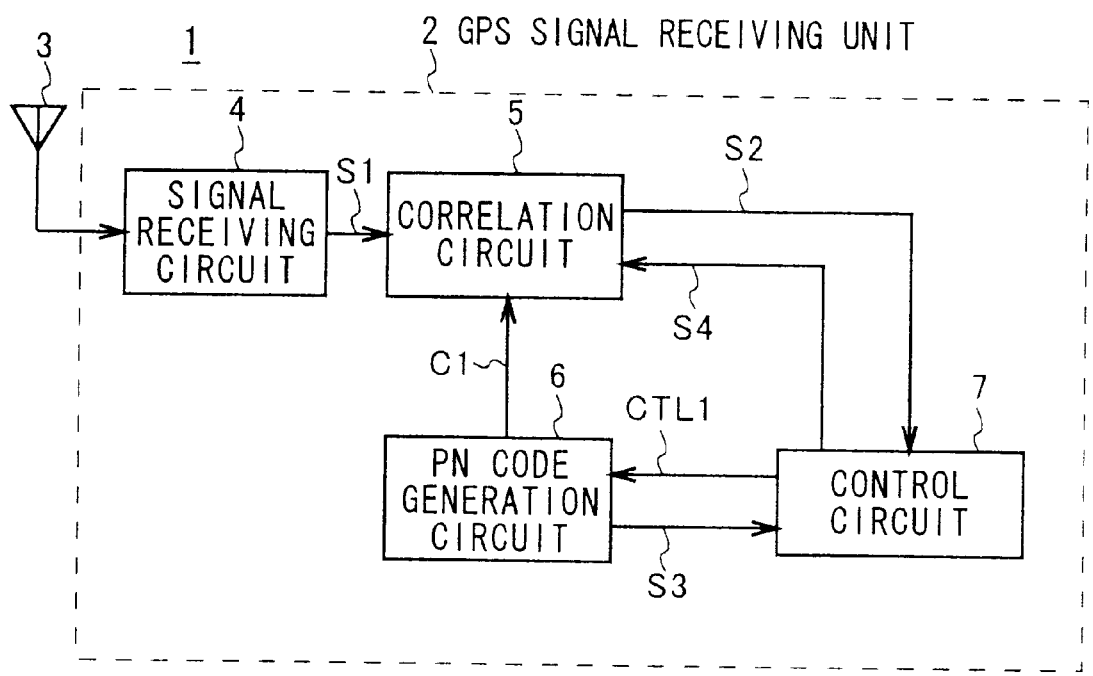
FIG. 1 is a block diagram showing the configuration of a conventional GPS signal receiving apparatus.
Figure 2:
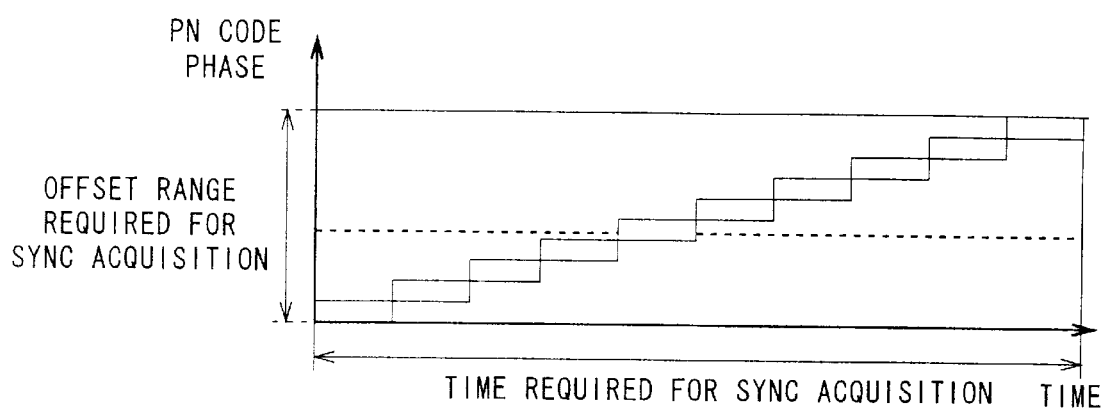
FIG. 2 is a brief linear diagram illustrating the synchronization acquisition in the case where no phase information of the conventional PN code exists.
Figure 3:
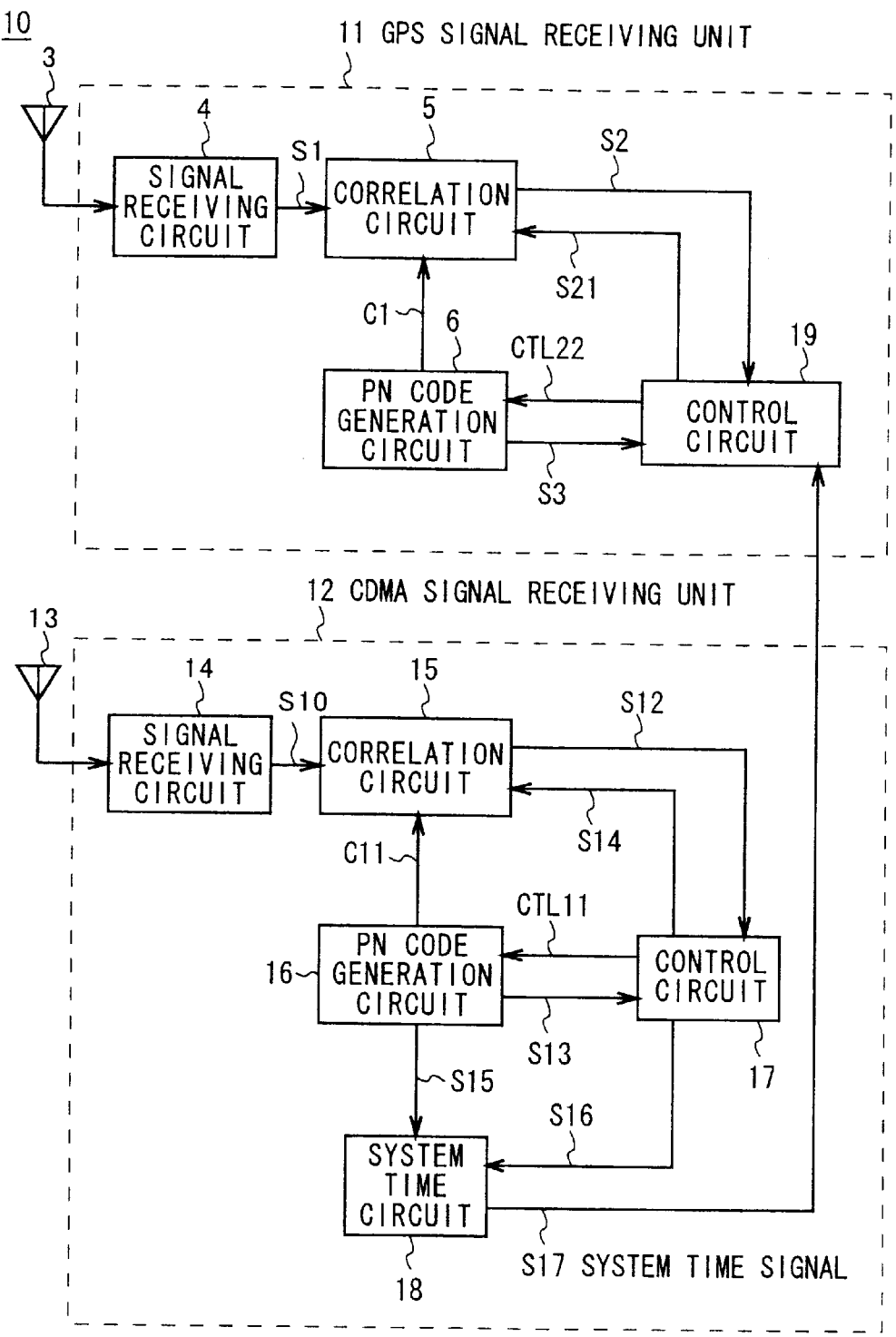
FIG. 3 is a block diagram showing the construction of a GPS signal receiving apparatus according to one embodiment of the present invention.

Preferred embodiments of this invention will be described with reference to the accompanying drawings:

In FIG. 3, in which corresponding parts of FIG. 1 are designated the same reference numerals, 10 generally shows a GPS signal receiving apparatus as the signal receiving apparatus of the global positioning system according to the present invention. And this GPS signal receiving apparatus is roughly comprised of a GPS signal receiving unit 11 for receiving the satellite signal S1 to be transmitted from the GPS satellite and a CDMA signal receiving unit 12 for receiving a spread spectrum signal S10 to be transmitted from the base station of the code division multiple access (CDMA) cellular system according to the direct sequence (DS) scheme compatible with the IS95 standard.

The CDMA signal receiving unit 12 enters the spread spectrum signal S10 received into the correlation circuit 15 via an antenna 13 and a signal receiving circuit 14. The correlation circuit 15 is comprised of a shift register and a multiplier, and by multiplying the local PN code C11 to be supplied from the PN code generation circuit 16 by the spread spectrum signal S10, calculates the correlation value S12 and transmits this to the control circuit 17.

When the correlation value S12 is at the low level lower than the predetermined threshold value, the control circuit 17 judges that the PN code of the spread spectrum signal S10 and the local PN code C11 generated at the PN code generation circuit 16 are not synchronized each other, and by supplying the phase control signal CTL11 to the PN code generation circuit 16, offset controls the phase of the local PN code C11.

The PN code generation circuit 16 offsets the phase of the local PN code C11 based on the phase control signal CTL11, and as well as transmitting the resultant local PN code C11 of which the phase is offset to the correlation circuit 15, sends back the phase result information S13 showing the phase condition of the local PN code C11 to the control circuit 17.

Accordingly, when the control unit 17 judges that the synchronization is not secured based on the correlation value S12 from the correlation circuit 15, it generates the phase control signal CTL11 responding to the phase result information S13, and sending this out to the PN code generation circuit 16, sequentially offsets phases of the local PN code C11 by the PN code generation circuit 16 and outputs these.

Furthermore, when the correlation value S12 is at the high level exceeding the predetermined threshold value, the control circuit 17 judges that the PN code of the spread spectrum signal S10 and the local PN code C11 generated at the PN code generation circuit 16 are synchronized and conducts the supplementary synchronization.

At this point, the control circuit 17 informs that the synchronization is secured to the PN code generation circuit 16 by means of the phase control signal CTL11 and simultaneously, generates a demodulation control signal S14 showing the head timing of the cycle in the PN code of the spread spectrum signal S10 at the time of data demodulation and transmits this to the correlation circuit 15.

The correlation circuit 15 comprises a demodulation unit (not shown in Fig.) inside in addition to the shift register and the multiplier. And the correlation circuit 15 demodulates the transmission data transmitted from the base station by applying the inverse spread spectrum processing to the spread spectrum signal S10 based on the demodulation control signal S14 at the demodulation unit.

When the PN code generation circuit 16 recognizes that the synchronization has been secured by the phase control signal CTL11 from the control circuit 17, supplies a code timing signal S15 showing the timing when the sync is secured, i.e., the head timing of cycle in the PN code of the spread spectrum signal S10 to the system time circuit 18 comprising counters.

The system time circuit 18 generates a system time signal S17 as a reference signal by resetting the counter at the timing synchronized with the code timing signal S15 supplied from the PN code generation circuit 16 corresponding to the system time control signal S16 from the control circuit 17, and sends this out to the control circuit 19 of the GPS signal receiving unit 11.

At this point, the base station of the CDMA cellular system receives the satellite signal S1 to be transmitted from the GPS satellite. Since the CDMA time to become the reference when generating the spread spectrum signal S10 is set based on the GPS time obtained analyzing the satellite signal S1, the GPS time and the CDMA time are synchronized at the predetermined timing.

In practice, as shown in FIGS. 4A and 4B, since the chip rate of the PN code of the satellite signal S1, (1.023 MHz=$2^3 \times 3 \times 5^3 \times 11 \times 31$ Hz), to be transmitted by the GPS satellite is different from the chip rate of the PN code of the spread spectrum signal S10, (1.2288 MHz=$2^{14} \times 3 \times 5^2$ Hz), to be transmitted by the base station of the CDMA cellular system, the transmission time TGPS-YX of the satellite signal S1 to be transmitted by the GPS satellite and the transmission time TCDNA-TX of the spread spectrum signal S10 to be transmitted by the base station of the CDMA cellular system are not necessarily always in synchronism.

However, since the greatest common measure of both chip rates is $2^3 \times 3 \times 5^2 = 600$ Hz, breakpoints of these PN codes are coincided per 1.6666 . . . msec in terms of time. However, since the cycle of PN code in the satellite signal S1 is 1 msec, breakpoints of the PN code of the satellite signal S1 and of the PN code of the spread spectrum signal S10 are synchronized per the multiple of a cycle, i.e., 5 msec.

Accordingly, in the system time circuit 18, resetting the internal counter per 5 msec, the system time signal S17 and the PN code of the satellite signal S1 to be transmitted from the GPS satellite become the synchronized conditions per 5 msec.

In this connection, in FIG. 4B, the base station of the CDMA cellular system is arranged to transmit the spread spectrum signal S10 per 1.25 msec. However, this is not the cycle of PN code of the spread spectrum signal S10 (in this case 26.666 . . . msec but is the cycle of the base station conducting the power control of the transmitting electric power. And this is used as a matter of convenience when explaining the synchronization between the PN code of the satellite signal S1 and the PN code of the spread spectrum signal S10 per 5 msec.

The control circuit 19 of the GPS signal receiving unit 11, by entering the system time signal S17 synchronized with the code timing signal S15, can recognize the head timing of the cycle in PN code of the satellite signal S1 to be transmitted from the GPS satellite based on the system time signal S17 as the reference signal per chip.

At this point, as shown in FIG. 4C, the time when the spread spectrum signal S10 arrives to the CDMA signal receiving unit 12 is that of the transmission time TGPS-TX when the base station of the CDMA cellular system transmitted the spread spectrum signal S10 is added by the propagation path delay RX, i.e., the arrival time TCDMA-RX.

Furthermore, since the system time signal S17 is generated after the spectrum diffusion signal S10 has arrives at the CDMA signal receiving unit 12 and the internal signal receiving processing such as the correlation detection and the demodulation processing has been conducted, the system time signal S17 is supplied to the control circuit 19 of the GPS signal receiving unit 11 at the received time TCDMA-M that the internal processing delay M of the CDMA is added to the propagation path delay RX as shown in FIG. 4D.

Accordingly, the control circuit 19 of the GPS signal receiving unit 11, conducting the correction to the system time signal S17 after due consideration for the propagation path delay RX and the internal processing delay M, predicts the head timing of the cycle of PN code in the satellite signal S1 to be transmitted from the GPS satellite. And as shown in FIGS. 4D and 4E, this is made to be the GPS time TGPS-1 calculated backward from the system time signal S17.

However, the GPS time TGPS-1 to be counted backward delays for the predicted error I according to the correction with respect to the actual transmission time TGPS-TX of the satellite signal S1. This predicted error I includes the corrected error of the predicted propagation path delay RX.

The predicted error I can be obtained from experiential values. In this embodiment, a case is described as one example where the base station is located farther than it was predicted to be at the timing of signal reception in the CDMA signal receiving unit 12.

With this arrangement, the control unit 19 of the GPS signal receiving unit 11 can assume the arrival time TGPS-RX1 of the satellite signal S1 delayed by the propagation path delay RX1 as the arrival time of the satellite signal S1. However, in practice, since errors equivalent to the predicted error I exist, the arrival time TGPS-RX can be regarded as the actual arrival time of the satellite signal S1.

Figure 5:
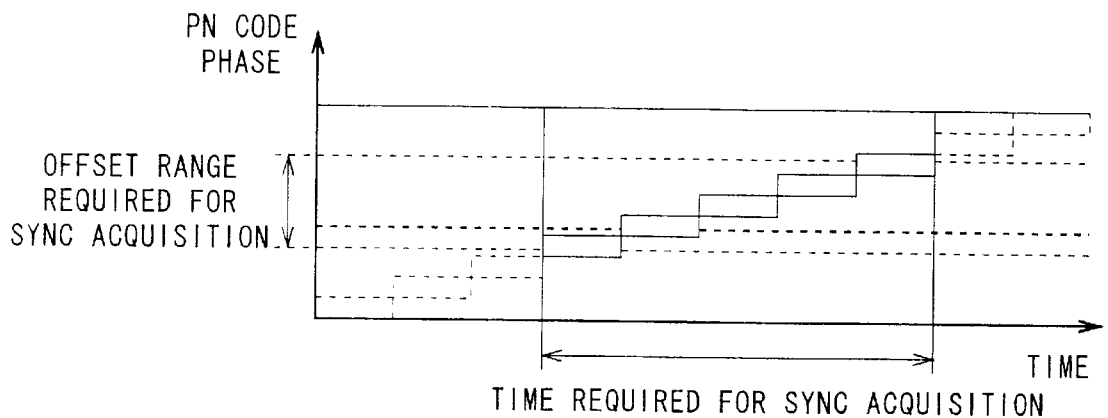
FIG. 5 is a brief linear diagram illustrating the synchronization acquisition in the case where the phase information of PN code exists.

Thus, the control circuit 19 of the GPS signal receiving unit 11, by setting the time for error corresponding to the predicted error I as the search range in the case when acquiring the synchronization from the arrival time TGPS-RX, can acquire the synchronism in a short period of time only by conducting the phase offset for only search width as shown in FIG. 5.

The control circuit 17 of the CDMA signal receiving unit 12 (FIG. 3), as well as recognizing the CDMA time synchronized with the GPS time according to the synchronization acquisition, recognizes the current position of the terminal itself from the base station in communication, and supplies the CDMA time and the current position of the terminal itself to the control circuit 19 of the GPS signal receiving unit 11.

The control circuit 19 of the GPS signal receiving unit 11, by assuming the communicable GPS satellite based on the CDMA time and the current position of the terminal itself, can made prediction on the type of PN code allocated to the GPS satellite assumed.

More specifically, the control circuit 19 of the GPS signal receiving unit 11 generates a phase control signal CTL22 for generating the PN code C1 in which the phase is offset according to the corrected time TGPS-RXI per chip taking the propagation path delay RXI of the satellite signal S1 into consideration, and supplies this to the PN code generation circuit 6 for GPS satellite assumed.

Thus, the PN code generation circuit 6 generates the local PN code C1 of which the phase is offset corresponding to the corrected time TGPS-RXI based on the phase control signal CTL22, and supplies this to the correlation circuit 5.

The correlation circuit 5 calculates a correlation value S2 by conducting the sliding correlation of the satellite signal S1 and the local PN code C1 supplied from the PN code generation circuit 6 and sends this out to the control circuit 19.

Then, the control circuit 19 judges whether or not the synchronization can be secured based on the correlation value S2 obtained from the correlation circuit 5 by conducting the sliding correlation. And by sequentially conducting the phase offset the phases of local PN code C1 to be generated from the PN code generation circuit 6 by the phase control signal CTL22 corresponding to the judgment result, the control circuit 19 can secure the synchronization in the correlation calculation processing time for the search range at the longest.

Furthermore, the control circuit 19, by supplying the head timing of the cycle of the local PN code C1 obtained by securing the synchronization to the correlation circuit 5 as a demodulation control signal S21, can obtain data such as navigation message only by demodulating the satellite signal S1 at the timing of demodulation control signal S21 not demodulating all satellite signals S1 by the correlation circuit 5.

Figure 6:
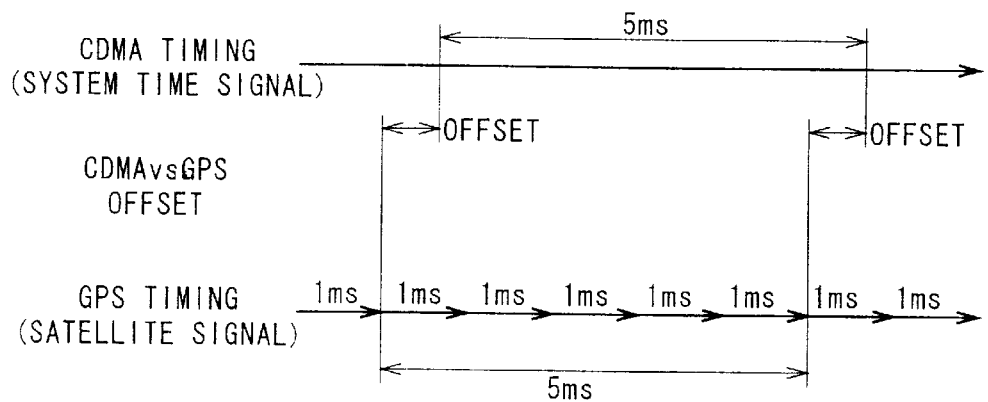
FIG. 6 is a brief linear diagram illustrating the case when the supply of system time signal is received at the timing of 5 msec.

As shown in FIG. 6, since the satellite signal S1 and the System time signal S17 are synchronized per 5 msec, and the timing when the system time signal S17 is to be supplied is the time of common multiple of the cycle of the PN code (1 msec) in the satellite signal S1, offsets of the head of PN code in the satellite signal S1 received at the terminal and the timing when the system time signal S17 is to be supplied are constantly equal.

Thus, it is sufficient for the control circuit 19 of the GPS signal receiving unit 11 to control the correlation only considering for this offset, and thus, the calculation for offset becomes easy.

Figure 7:
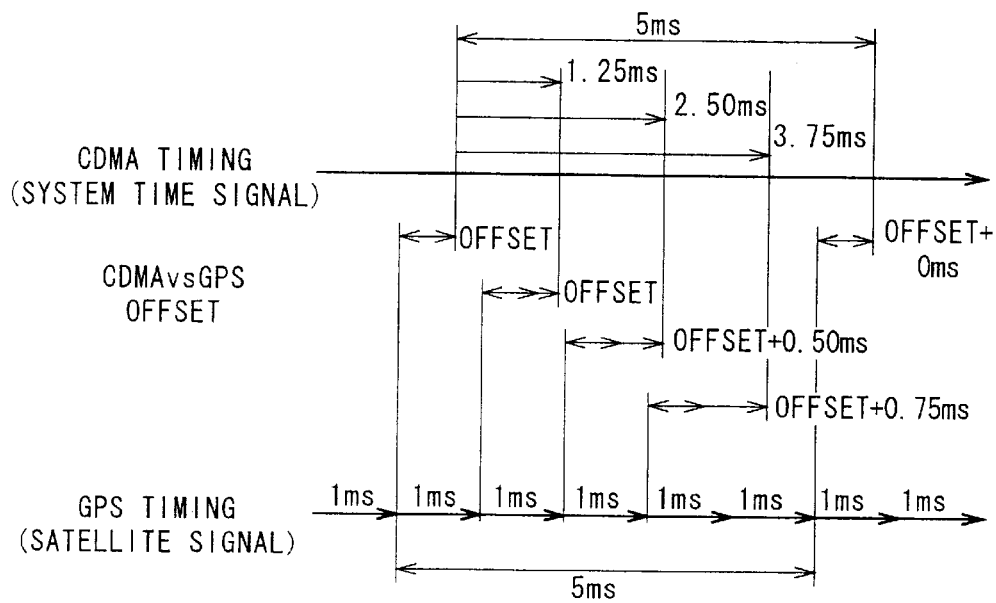
FIG. 7 is a brief linear diagram illustrating the case when the supply of system time signal is received at the timing of 1.25 msec.

On the other hand, as shown in FIG. 7, in the GPS signal receiving unit 11, the synchronization acquisition would not be conducted per 5 msec but when starting the synchronization acquisition of the satellite signal S1 per 1 msec after acquiring the synchronization of the spread spectrum signal S10 by the CDMA signal receiving unit 12, the system time signal S17 can be supplied per 1.25 (5/4)msec from the system time circuit 18 of the CDMA signal receiving unit 12.

However, in this case, since the system time signal S17 to be supplied from the system time circuit 18 becomes 1.25 msec, 2.5 msec, 3.75 msec . . . , the correction of 0.25 msec, 0.50 msec and 0.75 msec becomes necessary respectively to the system time signal S17 to be supplied in the GPS signal receiving unit 11. After all, the difference of 0.25 msec brings an accumulative effect, correction is made for that difference.

Figure 8:
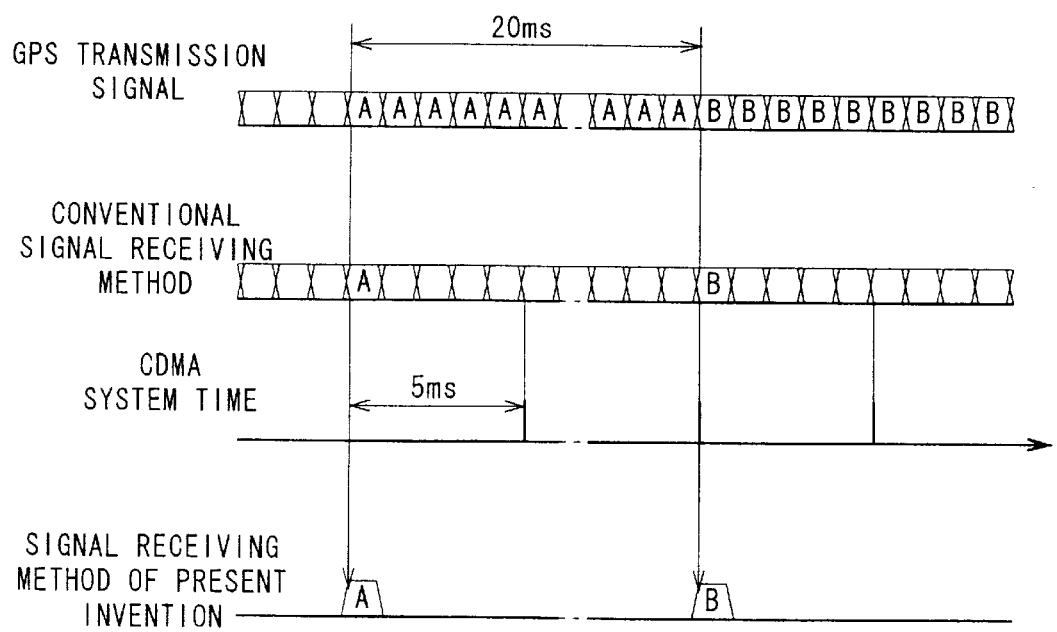
FIG. 8 is a brief linear diagram showing the relationship of the sync reception of satellite signals.

Furthermore, in the GPS signal receiving unit 11, as shown in FIG. 8, the satellite signal S1 is transmitted at the transmission speed of 50 bps, and this shows that same one bit is repeatedly transmitted at 20 msec, that is 20 times of the PN code (1 cycle is 1 msec) in the satellite signal S1.

Accordingly, the GPS signal receiving unit 11 has to demodulate only for 1 msec out of 20 msec intermittently at the demodulation processing timing corresponding to the system time signal S17, and it becomes unnecessary to demodulate all of 20 msec. In the conventional case, data for 1 msec is repeatedly received, and data for 20 msec is all demodulated.

With this arrangement, it becomes enough for the GPS signal receiving unit 11 just to conduct the demodulation processing intermittently at the timing corresponding to the system time signal S17 using the time-sharing system. And thus, the consumption of electric power can be reduced.

According to the foregoing construction, the GPS signal receiving apparatus 10 conducts the synchronization acquisition to the spread spectrum signal S10 at the CDMA signal receiving unit 12, and generates the system time signal S17 as a reference signal synchronized with the head timing of the cycle in the PN code of the resulting spread spectrum signal S10 and supplies this to the control circuit 19 of the GPS signal receiving unit 11.

The control circuit 19 of the GPS signal receiving unit 11, by conducting the correction to the system time signal S17 considering the propagation path delay RX of the spread spectrum signal S10 and the internal processing delay M in the CDMA signal receiving unit 12, predicts the head timing of the cycle of PN code of the satellite signal S1 to be transmitted from the GPS satellite per chip.

Then, the control circuit 19 of the GPS signal receiving unit 11 sets the time for the predicted errors to the head timing of the cycle of PN code of the satellite signal S1 predicted per chip as the range of search in the case of securing the synchronization, and conducts the correlation calculation by sequentially offsetting the phases of the local PN code C1 to be transmitted from the PN code generation circuit 6.

With this arrangement, the GPS signal receiving unit 11 can secure the synchronization within the time of search range at the maximum. And as compared with the case where it conducted the phase offset for 1023 chips at the maximum when it did not receive the supply of system time signal S17, the processing time required for securing the synchronization can be remarkably shortened and also the consumption of electric power can be reduced.

Furthermore, the GPS signal receiving unit 11, by utilizing the head timing of the cycle of the local PN code C1 to be obtained by securing the synchronization as the demodulation control signal S21, can secure the data such as the navigation message in a short time by demodulating only at the timing of demodulation control signal S21 not demodulating all of satellite signal S1.

According to the foregoing construction, since the GPS signal receiving apparatus 10 generates the system time signal S17 as a reference signal by securing the synchronization to the spread spectrum signal S10 from the base station of the CDMA cellular system synchronized with the satellite signal S1 of the GPS satellite, and calculates the correlation to the PN code of the satellite signal S1 in utilizing the system time signal S17, synchronization can be secured at high velocity and the consumption of electric power can be reduced.

Thus, the GPS signal receiving apparatus 10 can grasp the head timing of the cycle of PN code in the case of demodulating the data such as the navigation message synchronized with the PN code of the satellite signal S1, that is the demodulation control signal S21, the data such as navigation message can be obtained by demodulating only at the timing of demodulation control signal S21 but not demodulating all of the satellite signal S1.

Thus, since the GPS signal receiving apparatus 10 becomes capable of executing the synchronization acquisition to the satellite signal S1 at high velocity and in a short period of time, the synchronization acquisition can be executed in a short period of time even in the case of receiving the satellite signal S1 intermittently. And thereby the consumption of electric power related to the synchronization acquisition can be further reduced and a long duration usage can be realized.

Furthermore, the embodiment described above has dealt with the case of generating the system time signal S17 by securing the synchronism with the spread spectrum signal S10 from the base station of the CDMA cellular system synchronized with the satellite signal S1 of the GPS satellite. However, the present invention is not only limited to this but also the system time signal S17 can be generated by securing the synchronism with the transmission signal from the base station of the cellular system of such as the Global System for Mobile Communications (GSM) system, that is synchronized with the satellite signal S1 of the GPS satellite. In this case the same effects as those of the embodiment described above can be obtained.

Furthermore, the embodiment described above has dealt with the case of applying the present invention to the GPS signal receiving apparatus 10 equipped with the CDMA signal receiving unit 12 for receiving the spread spectrum signal S10 from the base station of the CDMA cellular system. However, the present invention is not only limited to this but also it can be applied to the mobile wireless terminal apparatus as the mobile station of the CDMA cellular system in which the GPS signal receiving unit 11 is loaded inside.

Figure 9:
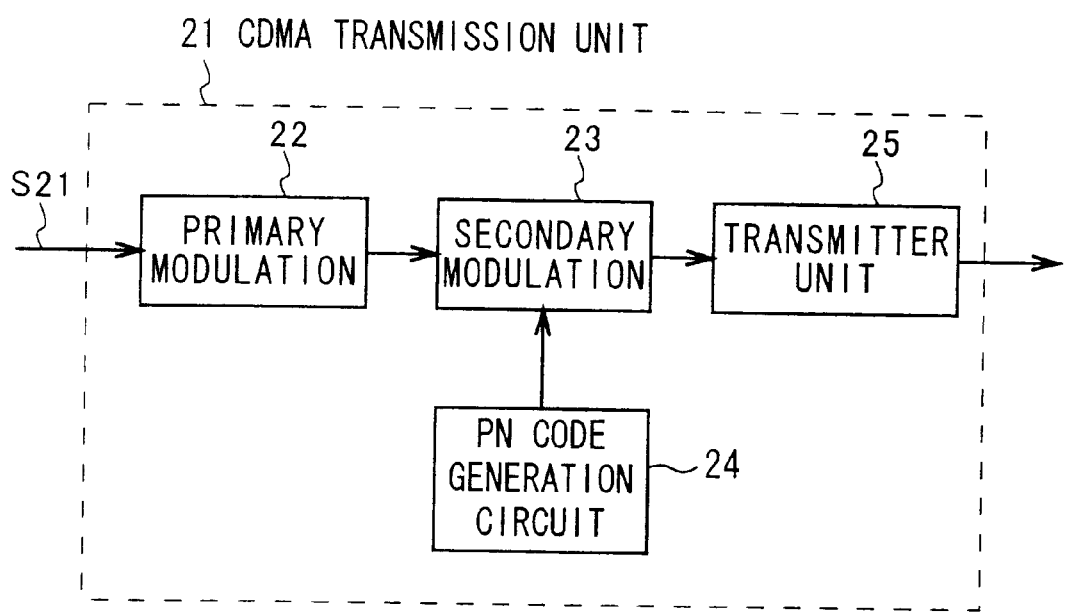
FIG. 9 is a block diagram showing the configuration of the CDMA transmission unit of the mobile wireless terminal apparatus according to the other embodiment.

In this case, as shown in FIG. 9, the mobile wireless terminal apparatus 20 comprises a CDMA transmission unit 21 in addition to the GPS signal receiving unit 11 and the CDMA signal receiving unit 12 of the GPS signal receiving apparatus 10 (FIG. 3). In this case, the CDMA transmission unit 21 transmits a baseband signal to be transmitted to the primary modulation circuit 22.

The primary modulation circuit 22 generates a primary modulation signal S22 by conducting the quadrature phase shift keying (QPSK) modulation processing to the baseband signal S21 and outputs this to the secondary modulation circuit 23. The secondary modulation circuit 23 generates a spread spectrum signal S23 by spread processing the primary modulation signal S22 by the PN code C33 to be supplied from the PN code generation circuit 24, and outputs this to the transmission unit 25. The transmission unit 25, after frequency modulating and amplifying the spread spectrum signal S23, transmits this via an antenna (not shown in Fig.).

With this arrangement, the mobile wireless terminal apparatus 20 can secure the synchronism of the GPS signal receiving unit 22 in a short period of time in utilizing the system time signal S17 obtained by intermittently receiving the spread spectrum signal S10 and securing the synchronism at the CDMA signal receiving unit 12 in the same manner as the GPS signal receiving apparatus 10.

Furthermore, the embodiment described above has dealt with the case of predicting the start timing of cycle of the PN code in the satellite signal S1 to be transmitted from the GPS satellite per chip by conducting the correction considering the propagation path delay RX and the internal processing delay M in advance by the control circuit 19 of the GPS signal receiving unit 11. However, the present invention is not only limited to this but also a circuit to conduct the correction considering the propagation path delay RX and the internal processing delay M can be provided inside of the CDMA signal receiving unit 12.

Furthermore, the embodiment described above has dealt with the case of generating the GPS signal receiving apparatus 10 as the signal receiving apparatus of the global positioning system by the antenna 13 and signal receiving circuit 14 as the communication system receiving means for receiving the spread spectrum signal S10 that is the transmission signal of the CDMA cellular system as the communication system in synchronism with the satellite signal S1 to be transmitted from the GPS satellite of the global positioning system, the system time circuit 18 as the timing signal generating means for generating the system time signal S17 as a reference signal used to synchronize with the satellite signal S1 based on the spread spectrum signal S10 of the CDMA cellular system, the control circuit 19 as the satellite signal receiving means for receiving the satellite signal S1 and for acquiring the synchronism with the pseudo noise code in the satellite signal S1 based on the system time signal S17 to be supplied from the system time circuit 18, the PN code generation circuit 6 and the correlation circuit 5. However, the present invention is not only limited to these but also the GPS signal receiving means can be comprised of various other signal receiving means, timing signal generating means and the satellite signal receiving means.

According to the present invention as described above, since the transmission signal from the base station of the communication system, that is synchronized with the satellite signal to be transmitted from the satellite of the global positioning system is received, the timing signal as a reference signal used to synchronize with the satellite signal is generated based on the transmission signal of the communication system, the satellite signal is received and the synchronization with the pseudo noise code in the satellite signal is to be acquired based on the timing signal to be supplied from the timing signal generating means, the synchronization with the pseudo noise code in the satellite signal can be executed in synchronism with the timing signal in a short period of time. And thereby, the consumption of electric power can be further reduced and the duration of usable time can be extended.

While there has been described in connection with the preferred embodiments of the invention, it will be obvious to those skilled in. the art that various changes and modifications may be aimed, therefore, to cover in the appended claims all such changes and modifications as fall within the true spirit and scope of the invention.

What is claimed is:

1. A signal receiving apparatus of a global positioning system comprising:

communication system receiving means for receiving a transmission signal synchronized with a satellite signal to be transmitted from a satellite of the global positioning system, from a base station of the communication system;

timing signal generating means for generating the timing signal as a reference signal used to synchronize with said satellite signal based on the transmission signal of said communication system; and satellite signal receiving means for receiving said satellite signal and securing synchronization with pseudo noise code in said satellite signal based on said timing signal to be supplied from the timing signal generating means.

2. The signal receiving apparatus of the global positioning system according to claim 1, wherein said timing signal generating means generates timing information required for demodulating said satellite signal by securing synchronization with the pseudo noise code of transmission signal from the base station of said communication system.

3. The signal receiving apparatus of the global positioning system according to claim 2, wherein said signal receiving means recognizes the location of said base station based on data to be obtained by demodulating the transmission signal from the base station of said communication system; and said satellite signal receiving means assumes communicable satellite from among multiple satellites existing based on said timing information obtained by said timing signal generating means and said location recognized by said signal receiving means, and predicts the type of code series of PN code corresponding to said satellite assumed to be communicable.

4. The signal receiving apparatus of the global positioning system according to claim 1, wherein said timing signal generating means recognizes the phase of pseudo noise code in said satellite signal synchronized with the transmission signal by obtaining synchronism with the pseudo noise code in the transmission signal from the base station of said communication system.

5. The signal receiving apparatus of the global positioning system according to claim 1, wherein said satellite signal receiving means demodulates said satellite signal intermittently only at the timing when said timing signal is supplied thereto.

6. The signal receiving apparatus of the global positioning system according to claim 1, wherein said satellite signal receiving means corrects the time difference between the timing of said received satellite signal and the timing signal by adding the propagation path delay of the transmission signal from the base station of said communication system and the internal processing delay to said timing signal, generated due to the formation of the timing signal.

7. The signal receiving apparatus of the global positioning system according to claim 1, wherein said timing signal generating means generates said timing signal with a common multiple of the cycle of the least unit time with which breakpoints of the pseudo noise code in said satellite signal and the pseudo noise code of the transmission signal from the base station of said communication system are coincided.

8. The signal receiving apparatus of the global positioning system according to claim 7, wherein said timing signal generating means generates said timing signal with a common multiple of the cycle of 5 msec.

9. The signal receiving apparatus of the global positioning system as defined in claim 7, wherein said timing signal generating means generates said timing signal with a common multiple of the cycle of 1.25 msec.

10. The signal receiving apparatus of the global positioning system according to claim 1, wherein said communication system is a CDMA cellular system using the direct diffusion system.

11. A mobile wireless terminal apparatus comprising:

communication system receiving means for receiving a transmission signal synchronized with a satellite signal to be transmitted from a satellite of the global positioning system from a base station of the communication system;

communication system transmitting means for transmitting signal to the base station of said communication system;

timing signal generating means for generating the timing signal as a reference signal used to synchronize with said satellite signal based on the transmission signal of said communication system; and satellite signal receiving means for receiving the satellite signal and for securing the synchronism with the pseudo noise code in said satellite signal based on said timing signal to be supplied from said timing signal generating means.

12. The mobile wireless terminal apparatus according to claim 11, wherein said timing signal generating means generates a time information required for demodulation of said satellite signal by securing the synchronization with the pseudo noise code in the transmission signal from the base station of said communication system.

13. The mobile wireless terminal apparatus according to claim 12, wherein said signal receiving means recognizes the position of said base station based on the data to be obtained by demodulating the transmission signal from the base station of said communication system; and said satellite signal receiving means assumes the communicable satellite from among multiple satellites existing based on the time information obtained by said timing signal generating means and the position recognized by said signal receiving means, and predicts the type of code series of PN code corresponding to said satellite assumed to be communicable.

14. The mobile wireless terminal apparatus according to claim 11, wherein said timing signal generating means recognizes the phase of the pseudo noise code in said satellite signal synchronized with said transmission signal by securing synchronism with the pseudo noise code in the transmission signal from the base station of said communication system.

15. The mobile wireless terminal apparatus according to claim 11, wherein said satellite signal receiving means demodulates said satellite signal intermittently only at the timing when said timing signal is supplied thereto.

16. The mobile wireless terminal apparatus according to claim 11, wherein said satellite signal receiving means corrects the time difference between the timing when said satellite signal is received and said timing signal by adding the propagation path delay of the transmission signal from the base station of said communication system and the internal processing delay related to the formation of said timing signal to said timing signal.

17. The mobile wireless terminal apparatus according to claim 11, wherein said timing signal generating means generates said timing signal with the common multiple of the cycle of the least unit time with which the breakpoints of the pseudo noise code of the transmission signal from the base station of said communication system and the pseudo noise code in said satellite signal are in agreement.

18. The mobile wireless terminal apparatus according to claim 17, wherein said timing signal generating means generates said timing signal with the common multiple of the cycle of 5 msec.

19. The mobile wireless terminal apparatus according to claim 17, wherein said timing signal generating means generates said timing signal with the common multiple of the cycle of 1.25 msec.

20. The mobile wireless terminal apparatus according to claim 11, wherein said communication system is a CDMA cellular system using the direct diffusion system.

* * * * *